United States Patent
Augot et al.

(10) Patent No.: US 10,289,862 B2
(45) Date of Patent: May 14, 2019

(54) STORAGE EFFICIENT AND UNCONDITIONALLY SECURE PRIVATE INFORMATION RETRIEVAL

(71) Applicants: ALCATEL LUCENT, Boulogne Billancourt (FR); INSTITUT NATIONAL DE RECHERCHE EN INFORMATIQUE ET EN AUTOMATIQUE, Le Chesnay (FR)

(72) Inventors: Daniel Augot, Orsay (FR); Françoise Levy-dit-Vehel, Paris (FR); Abdullatif Shikfa, Nozay (FR)

(73) Assignees: ALCATEL LUCENT, Boulogne Billancourt (FR); INSTITUT NATIONAL DE RECHERCHE EN INFORMATIQUE ET EN AUTOMATIQUE, Chesnay (FR)

( * ) Notice: Subject to any disclaimer, the term of this patent is extended or adjusted under 35 U.S.C. 154(b) by 121 days.

(21) Appl. No.: 15/304,149
(22) PCT Filed: Apr. 14, 2015
(86) PCT No.: PCT/EP2015/058103
§ 371 (c)(1),
(2) Date: Oct. 14, 2016
(87) PCT Pub. No.: WO2015/158733
PCT Pub. Date: Oct. 22, 2015

(65) Prior Publication Data
US 2017/0032142 A1 Feb. 2, 2017

(30) Foreign Application Priority Data
Apr. 14, 2014 (EP) .................................. 14305549

(51) Int. Cl.
*G06F 21/00* (2013.01)
*G06F 21/62* (2013.01)
*H04L 9/08* (2006.01)

(52) U.S. Cl.
CPC .......... *G06F 21/6227* (2013.01); *H04L 9/085* (2013.01); *H04L 2209/34* (2013.01)

(58) Field of Classification Search
CPC .. G06F 21/6227; H04L 9/085; H04L 2209/34
See application file for complete search history.

(56) References Cited

U.S. PATENT DOCUMENTS

| | | | | |
|---|---|---|---|---|
| 2012/0185437 A1* | 7/2012 | Pavlov | ............. | G06F 17/30094 707/652 |
| 2012/0246547 A1* | 9/2012 | Yekhanin | ............ | H03M 13/033 714/784 |
| 2013/0336589 A1* | 12/2013 | Takahashi | ................. | G06T 9/00 382/215 |

OTHER PUBLICATIONS

New Locally Decodable Codes and Private Information Retrieval Schemes|Sergey Yekhanin|2006|pp. 1-14.*

(Continued)

*Primary Examiner* — Mahfuzur Rahman
(74) *Attorney, Agent, or Firm* — Patterson Thuente Pedersen, P.A.

(57) ABSTRACT

A method of storing and retrieving a set of original data (E1, . . . , En) in and from a plurality of remote servers (SP1, . . . , SPI+1), comprises a coding step which consists in creating a set of coded data (S1, . . . , SN) from the set of original data (E1, . . . , En), a storing step which consists in storing the set of coded data (S1, . . . , SN) into the plurality of remote servers (SP1, . . . , SPI+1). Each server (SP1, . . . , SPI+1) of the said plurality of servers stores only a respective part of the set of coded data (S1, . . . , SN) and the method comprises a step which consists in generating a table (T1, T2) which indicates which respective part of the set of coded data (S1, . . . , SN) is stored in which server of the said plurality of remote servers (SP1, . . . , SPI+1).

4 Claims, 2 Drawing Sheets

(56) References Cited

OTHER PUBLICATIONS

Woodruff et al., "A Geometric Approach to Information—Theoretic Private Information Retrieval", Proceedings of the twentieth Annual IEEE Conference on Computational Complexity. Jun. 11, 2005.
Barkol, et al., "On Locally Decodable Codes, Self-Correctable Codes, and t-Private PIR", Algorithmica (2010). vol. 58., No. 4., Published online Jan. 27, 2009.
Beimel et al., "Robust-Information—Theoretic Private Information Retrieval", Journal of Cryptology. Jul. 1, 2007, 14 pages.DOI:10.1007/s00145-007-0424-2.
Guo et al., "New Affine-Invariant Codes from Lifting", Nov. 9, 2012. 27 pages.
Devet et al., "Optimally Robust Private information Retrieval", International Association for Cryptologic Research, vol. 20120622:115220. Jun. 22, 2012. 16 pages.
Devet et al., "Optimally Robust Private Information Retrieval", USENIX Apr. 11, 2013. 15 pages.
International Search Report and Written Opinion for International Application No. PCT/EP2015/058103 dated Jul. 20, 2015.
Biemel et al., "Breaking the $n^{l/(K-l)}$ barrier for information-theoretic private information retrieval" Foundations of Computer Science, 2002. Proceedings, The 43rd Annual IEEE Symposium on, vol. 59, pp. 261-270, 2002.
Chor et al., "Private Information Retrieval", Journal of ACM 45(6):965-981. Apr. 21, 1998.
Gemmell et al., "Highly Resilient Correctors for Polynomials" Information Processing Letters, 43(4):1 69-1 74, Sep. 1992.
Guruswami et al., "Linear-algebraic list decoding for variants of reed-solomon codes. Information Theory", IEEE Transactions on, 59(6) :3257- 3268, Jun. 2013. Abstract provided.
Katz et al., "On the efficiency of local decoding procedures for error-correcting codes", Proceedings of the Thirtysecond Annual ACM Symposium on Theory of Computing, ACM, (2000).
Kopparty et al., "High-rate codes with sublinear-time decoding", Proceedings of the Forty-third Annual ACM Symposium on Theory of Computing, STOC'11, pp. 167-176, New York, NY, USA, 2011 . ACM.
Kushilevitz et al., "Replication is not needed: single database, computationally-private information retrieval", Computer Science, 1997. Proceedings. 38th Annual Symposium on, pp. 364-373, Oct. 1997.
Yekhanin, "Locally Decodable Codes and Private Information Retrieval Schemes", Information security and cryptography. Springer, 2010. Abstract, Preface and Introduction provided.
Yekhanin, "Locally Decodable, Codes, vol. 6 of Foundations and Trends in Theoretical Computer Science". NOW publisher, 2012. Abstract and Introduction provided.

* cited by examiner

STORAGE EFFICIENT AND UNCONDITIONALLY SECURE PRIVATE INFORMATION RETRIEVAL

RELATED APPLICATIONS

The present application is a National Phase entry of PCT Application No. PCT/EP2015/058103, filed Apr. 14, 2015, which claims priority to EP14305549.9, filed Apr. 14, 2014 the contents of each being incorporated herein by reference in their entireties.

TECHNICAL FIELD

The invention relates to storage of information in data storage servers, queries made to databases, and privacy of such queries.

BACKGROUND ART

Many documents and databases are nowadays stored in outsourced data storage servers. This trend is stressed further with the cloudification of many services and companies' information systems. While such outsourced databases are cheap to maintain and efficient to retrieve up-to-date information they can pose significant risks from a security or privacy perspective. Some solutions have been proposed so as to secure outsourced data storage on multiple clouds but they do not tackle the issue of privacy. Indeed by accessing a database the entity storing the database learns the queries of the queriers or users which might be a problem if the user's intentions are to be kept secret. For example, investors querying a stock-market database for the current market value of certain stocks might prefer not to reveal their interest in the stocks because it could inadvertently influence their price. Alternatively, companies might want to search for certain patents without revealing the patents' identities.

Private information retrieval—PIR—schemes are cryptographic protocols that allow clients to retrieve records from outsourced databases or clouds while completely hiding the identity of the retrieved records from database owners. There are two flavors of PIR either information theoretic PIR or Computational PIR. The latter provides a weaker security guarantee and we thus focus on information theoretic PIR which provides absolute guarantee that the servers get no information about what the user wants. Information-theoretic PIR is only possible in a multi-server setting with some replication across these servers. There is an extensive body of work that provides solutions to this problem based on coding theory and more particularly locally decodable codes or LDCs. However current solutions require a lot of replication. Basically if/is the locality of the LDC then the whole database needs to be encoded first which results in a first factor of increase of the size of the database and then the whole encoded database needs to be replicated/times on/different servers.

Suppose we have a database composed of n elements for example $E_1, \ldots, E_n$. Current solutions encode the database in a codeword of N symbols $S_1, \ldots, S_N$ with N>n and then store I copies of the encoded database at I different servers where I is the locality of the code. To retrieve a symbol $S_i$ without revealing it, the user has to retrieve one symbol from each server, none of them being $S_i$. The user thus gets I symbols and by local decoding can compute $S_i$. The symbols retrieved are not random, they are chosen according to a decoding algorithm, which indicates that one has to retrieve symbols $S_{j1}, \ldots, S_{jI}$ in order to be able to compute $S_i$. To make sure that the given symbols can always be retrieved, the existing protocols store all symbols on all servers, which means that the whole codeword of length N is replicated I times.

The technical problem to solve is to allow storage of a collection of documents or of databases in a plurality of outsourced storage entities or clouds while offering the possibility for users to query a piece of information from the database without revealing their query and in particular without revealing the piece of information to the servers or clouds, and while reducing the storage overhead of current solutions.

This goal is achieved thanks to the invention by means of the subject matter of claim 1.

BRIEF DESCRIPTION OF THE DRAWINGS

Other features goals and advantages of the invention will appear throughout the here-under detailed description which refers to the attached figures on which.

DETAILED DESCRIPTION

On the attached figure a database is represented which is composed of n elements $E_1, \ldots, E_n$.

In the present embodiment the symbols are thus organized and placed in such a way that only N/(I+1) symbols are stored at each server so in total the N symbols are stored and an additional small constraint is imposed on the decoding algorithm to make sure that it requires one symbol from each server. To be more precise, the codeword symbols or encoded database belong to a m-dimensional vector space over the finite field of cardinality I+1. A hyperplane in this space is an (m−1)–dimensional subspace. We arrange the symbols in (I+1) hyperplanes, and the user or client or querier or possibly broker will ask the symbols according to a line the direction of which is transversal, i.e. not parallel, to the direction of the hyperplanes. The benefit is of major importance: it reduces the storage overhead by a factor of I+1.

An (I,d)-locally decodable code allows to probilistically retrieve a particular symbol of a message by looking at only I randomly chosen coordinates of its possibly corrupted encoding, in such a way that the decoding still succeeds with probability greater that ⅔ even if a fraction of d symbols of the encoded data is corrupted. I is then the locality of the code.

On the attached figure clients or users or customers are represented under reference C. Storage providers e.g. cloud storage providers are represented under references SP1, SP2 . . . . Queriers Q want to access stored data. Brokers B1, B2 are represented. The role of such brokers, which are not necessary, is to facilitate some operations or perform them on behalf of C or Q. In the present example, the Clients C has outsourced data storage to SPs SP1, SP2, SP3 and SP4. Queriers Q want to access part of the stored data. For confidentiality reasons or to protect their privacy, Q do not want SPs to know which data or information it accessed. Once stored, SPs provides an API for Q to retrieve data based here on an identifier which is a concatenation of the name of the database in case there are several databases and of the index of the element in the database. SPs do not implement specific mechanisms to allow private information retrieval, they are classical storage providers. Brokers B1, B2 are either trusted, for example in the organisation of the entity which trusts them or an independent entity depending on the task that they perform. The storage of information is here implemented in the following manner. In a first step, client C encodes his database composed of n elements E1, . . . , En using an appropriate coding algorithm, a locally decodable code for example multiplicity codes. The database of n elements becomes encoded in N symbols S1, . . . , SN with N>n. This first step can be performed also by a first broker B1 which has to be trusted by C in that it does not reveal information to SPs. I being for example the value of the locality of the locally decodable code, the N symbols are divided in (l+1) groups, each group containing the symbols corresponding to one hyperplane of the total space, resulting in groups G1, . . . , Gl+1. Optionally this operation could be performed by the same trusted broker B1. The output of this step whether implemented by client C or by broker B1 is a function or table T1 indicating in which group a symbol Si can be found. On the attached figure the locally decodable code has locality 3.

Then each group of symbols is stored at a service provider SP. The choice of SP can depend on many parameters such as cost, latency, reliability and so on. To take into account these aspects, the dispatching and storage can be taken care of by a second broker B2, which simply needs to return a map between a group index and a storage provider. This map is typically represented in a table T2 of l+1 rows where row number i indicates the storage provider corresponding to Gi, and so on. Broker B2 does not need to be strongly trusted by client C, it could even be a service offered by one of the service providers. Client C simply advantageously checks that all the service providers SPs in the table T2 are distinct to each other so as to avoid collusions in a later step.

The query of information is here carried out in the following manner. When a querier Q wants to retrieve a given symbol, it first needs to retrieve the name of the database. The name of the database is usually public knowledge but in case client C wants to control access to his information, client C could force queriers to request permission first by keeping this knowledge secret or delegating this task to the trusted broker B1.

The querier is interested in Si but he needs to express his query as a set of l+1 queries Sj1, . . . , Sj(l+1) determined by the decoding algorithm. More precisely it picks a direction at random but not parallel to the hyperplanes direction and then computes the points Sj1, . . . , Sj(l+1) that he has to query. This computation could be performed by a broker B3 trusted by querier Q.

The querier Q or the broker B3 needs then to obtain T1 to determine to which group each Sji belongs and T2 to know where each group is stored. The querier or the broker B3 then fetches the Sj1, . . . , Sj(l+1) from the corresponding SPs and locally decodes them to obtain Si. One advantage of this method is that the method works with any PIR scheme based on multiplicity codes and presumably any locally decodable code. The protocol ensures that every individual server gets no information about the identity of the element the querier is interested in. The method divides the global storage overhead compared to existing solutions at least by a factor of I+1 where I is the locality of the decoding method. By fine tuning the parameters, it is possible to allow recovery from the defect of a number of SPs, which means that the method features inherent error-correcting capabilities and failure resilience. Fine tuning parameters can also allow to take into account collusion of a number of SPs without compromising security, i.e. secrecy of the query in this case. The brokers B1 and B3 can perform computations on behalf of C and Q respectively as long as they do not give information to the servers. The broker B2 is interesting as it can decide on the selection of SPs without the need to be trusted from a security perspective.

From the symbols it is possible to get back original documents by specific decoding mechanisms.

In the query phase of the present example querier Q sends the query to broker B3, which expresses it as several symbols, requests table T1 from broker B1 and table T2 from broker B2, and then requests the symbols from the corresponding SPs, the correspondence being here possible thanks to the tables. After receiving the requested symbols, broker B3 locally decodes them and sends the requested symbol back to querier Q.

According to more precise aspects of the presently described embodiment of the invention, A code in the ambient space encodes vectors of length k into codevectors, or codewords of length n>k. The problem of decoding is to find codewords close to an element y in the ambient space. Formally, given a code $C \subset \Sigma^n$, a distance $d(\ )$, for a given $y=(y_1, \ldots, y_n) \in \Sigma^N$, one has to find codewords $c \in C$ such that $d(c,y)$ is small. In our setting, the distance $d(x,y)$ is the Hamming distance which is the number of indices i where $x_i \neq y_i$.

Locally decodable codes, in short LDCs, allow efficient sublinear-time decoding. More precisely, an l-query LDC allows to probabilistically recover any symbol of a message by looking at only $l \ll k$ randomly chosen coordinates of its—possibly corrupted—encoding. Although LDCs appeared in the PCP literature in early 90s [?], their first formal definition is due to Katz and Trevisan in 2000 [5]. The number (of queried symbols is the query complexity, that we also call here locality. The oldest class of LDCs are the Reed-Muller codes over $\mathbb{F}_q$, whose codewords are the evaluations of m-variate polynomials of total degree at most d over $\mathbb{F}_q$ on points of $\mathbb{F}_q^m$. Formally:

A code C: $\Delta^k \to \Sigma^N$ is (l,δ)-locally decodable if there exists a randomized decoding algorithm A such that 1. given $x \in \Delta^k$ and $y \in \Sigma^n$ with $d(C(x),y) < \delta n$, we have, for all $i \in [k]$, $$Pr[A^y(i)=x_i] \geq 2/3,$$

where the probability is taken over all the random coin tosses of A.

2. A makes at most l queries to y.

Here $A^y$ means that A is given query access to y.

In the case when one wants to probabilistically recover any codeword symbol and not only information symbols, one has the following A code C: $\Delta^k \to \Sigma^n$ is (l, δ)-locally self-correctable (LCC) if there exists a randomized decoding algorithm A such that 1. given a codeword $c \in \Sigma^n$ and $y \in \Sigma^n$ with $d(c,y) < \delta n$, we have, for all $i \in [k]$, $$Pr[A^y(i)=c_i] \geq 2/3,$$

where the probability is taken over all the random coin tosses of A.

2. A makes at most l queries to y.

Note that one can easily construct an LDC from a linear LCC [9].

No known constructions of LDCs or LCCs minimize both l and the length n simultaneously. The main issues are thus to minimize one parameter given that the other one is fixed. With this respect, constructions of subexponential length codes with constant query complexity $l \geq 3$ exist [8]. On the other side, constant rate LDCs feature an l which is known to lie between $\Omega$ (log k) and $\Theta(k^1)$, with explicit constructions for the latter bound. A major result is the construction of high-rate (i.e. >½) locally self-correctable codes with sublinear query complexity, in the presence of a constant (as a function of the distance of the code) fraction of errors. Those codes are known as Multiplicity Codes and were introduced by Kopparty, Saraf and Yekhanin in 2011 [6]. They generalize the Reed-Muller codes by evaluating high degree multivariate polynomials as well as their partial derivatives up to some order. Using high-degree polynomials improves on the rate, while evaluating their partial derivatives compensates for the loss in distance.

The problem of Private Information retrieval was introduced in 1995 by Chor, Goldreich, Kushilevitz and Sudan [2]. A PIR protocol is a cryptographic protocol the purpose of which is to protect the privacy of a user accessing a public database via a server, in the sense that it makes it possible for a user to query a particular record of the database without revealing to the server which record he wants to retrieve (a.k.a. query anonymity). We here deal with information theoretic PIR, as opposed to computationally secure PIR [7]. In an IT PIR setting, a server gets no information about the identity of the record of user interest even if it has unlimited computing power. In [2] it is shown that when accessing a single database, to completely guarantee the privacy of the user in an information theoretic sense, one needs to download the entire database, which results in a communication complexity of O(n), n being the bit length of the database. Thus they have introduced scenarios where the database is replicated across several, say l servers, and proposed schemes with communication complexity O $(n^{1/\ell})$, for l≥3. Such multiple-server settings have been investigated since then, and the best communication complexity to date is $$n^{O\left(\frac{\log\log\ell}{\ell\log\ell}\right)} \text{ for } \ell \geq 3. \quad [1]$$

Katz & Trevisan [5], introduced a notion very close to locally decodable codes: that of smooth codes. Smooth codes capture the idea that a decoder cannot read the same index too often: informally, for fixed l and c, in an (l, c)-smooth code, the decoder, querying at most l indices from a valid codeword, cannot query an index more than c/m times. In [5], it is shown that an (l, δ)-LDC is an (l, c=l/δ)-smooth code.

Uniform distribution of the queries among codeword (or received word) coordinates is just had we need in the PIR setting in order to achieve information theoretic privacy of the queries. The locality as a core feature of LDCs, together with the fact that in all known constructions of LDCs the queries made by the local decoding algorithm A are uniformly distributed, make the application of LDCs to PIR schemes quite natural. The lemma below describes how it formally works.

Note also that PIR schemes can be used to build LDCs with best asymptotic code-lengths. In fact, as quoted in [1], "any information-theoretic PIR protocol can be converted into an LDC of related efficiency".

We model the database as a $\Delta$-ary string x of length k. An l-server PIR scheme involves l servers $S_1, \ldots, S_l$, each holding the same database x, and a user who knows k and wants to retrieve some value $x_i$, i∈[k] without revealing any information about i to the servers.

An l-server p-PIR protocol is a triple (Q, A, R) of algorithms running as follows:
User tosses random coins and obtains a random string s; then he invokes Q to generate an l-tuple of queries: $(q_1, \ldots, q_l)=Q(i,s)$.
For 1≤j≤l, User sends $q_j$ to server $S_j$.
Each $S_j$ answers $a_j=A (i, x, q_j)$.
User recovers $x_i$ by applying the reconstruction algorithm R $(a_1, \ldots, a_l, i, s)$.
Correctness: $\forall x \in \Delta^k$, i∈[k]. User recovers $x_i$ with proba≥p.
Privacy: each server individually gets no information about i. In other words, $\forall j \in [l]$ the distribution of the random variables $Q(i,')_j$ are identical for all i∈[k].

Note that Yekhanin [8] considers that the triple of algorithms (Q, A, C) are non-uniform, so that the length k is given as an advice.

Suppose there exists an l-query locally decodable code C: $\Delta^k \to \Sigma^n$, in which each decoder's query is uniformly distributed over the set of codeword coordinates. Then there exists an l-server 1-PIR protocol with O(l log(n|Σ|)) communication to access a database x∈$\Delta^k$.

Proof: given an LDC C: $\Delta^k \to \Sigma^n$ as in the lemma, one constructs the following PIR protocol:
(Preprocessing): for 1÷j≤l, server $S_j$ encodes x with C.
User tosses random coins and invokes the local decoding algorithm to generate $(q_1, \ldots, q_l) \in [n]^l$ s.t. $x_i$ can be computed from $$\{c(x)_{q_j}\}_{1 \leq j \leq \ell}.$$

For 1≤j≤l, User sends $q_j \in [n]$ to server $S_j$.
Each $S_j$ answers $C(x)_{q_j} \in \Sigma$.
User applies the local decoding algorithm of C to recover $x_i$.

This protocol has the communication complexity claimed in the lemma. Furthermore, as the user applies the local decoding algorithm with non corrupted inputs $$\{c(x)_{q_j}\}_{1 \leq j \leq \ell},$$

he retrieves $x_i$ with probability 1. Uniformity of the distribution of the decoder's queries over [n] ensures the information-theoretic privacy of the protocol. We will use LDCs, namely multiplicity codes, in PIR scenarios.

Considering m indeterminate $X_1, \ldots, X_m$, and m positive integers $i_1, \ldots, i_m$, we use the short-hand notation $X=(X_1, \ldots, X_m)$ $\mathbb{F}_q[X]=\mathbb{F}_q[x_1, \ldots, x_m]$ $i=(t_1, \ldots, t_m) \in \mathbb{N}^n$ $P=(p_1, \ldots, p_m) \in \mathbb{F}_q^m$ $|i|=i_1+\ldots+i_m$ $x^i{}_1{}^{i_1} \ldots x_m{}^{i_m}$, i.e. we use bold symbols for vectors, points, etc. and standard symbols for uni-dimensional scalars, variables, etc. In general, we write polynomials $Q \in \mathbb{F}_q[X]=\mathbb{F}_q[X_1, \ldots, X_m]$ without parentheses and without variables, and Q(X) (resp. Q(P)) when the evaluation on indeterminates (resp. points) has to be specified.

Given a multi-index i, and $F \in \mathbb{F}_q[x]$, the i-th Hasse derivative of F, noted by H(F, i) is the coefficient of $z^i$ in the polynomial $F(x+z) \in \mathbb{F}_q[x,z]$, where $Z=(Z_1, \ldots, Z_m)$. More specifically, let $F(X)=\Sigma_{j \gg 0} f_j X^j$, then $$F(X+Z) = \sum_j f_j(X+Z)^j$$
$$= \sum_j f_j(x_1+z_1)^{j_1} \ldots (x_m+z_m)^{j_m}$$
$$= \sum_j f_j \sum_i \binom{j}{i} X^{j-i} Z^i$$
$$= \sum_i H(F, i)(X) Z^i,$$

where $$H(F, i) = \sum_j f_j \binom{j}{i} X^{j-i}$$

$$\binom{j}{i} = \binom{j_1}{i_1} \ldots \binom{j_m}{i_m}.$$

Considering a vector $V \in \mathbb{F}_q^m \setminus \{0\}$, and a base point P, we consider the restriction of F to the line $$D = \{P + tV : t \in \mathbb{F}_q\}$$

which is a univariate polynomial that we denote $F_{P,V}(T)=F(P+TV) \in \mathbb{F}_q[T]$. This polynomial has Hasse derivatives on its own, and we have the following relations:

$$F_{P,V}(T) = \sum_j H(F, j)(P) V^j T^{|j|} \quad (1)$$

$$\text{coeff}(F_{P,V}, i) = \sum_{|j|=i} H(F, j)(P) V^j \quad (2)$$

$$H(F_{P,V}, i)(\alpha) = \sum_{|j|=i} H(F, i)(P + \alpha V) V^j, \quad (3)$$

for all $\alpha \in \mathbb{F}_q$ $$H(F_{P,V}, i)(0) = \sum_{|j|=i} H(F, j)(P) V^j \quad (4)$$

Considering the finite field $\mathbb{F}_q$ with q elements, we enumerate it as $$\mathbb{F}_q = \{a_0 = 0, a_1, \ldots, a_{q-1}\}.$$

We denote $\mathbb{F}_q[X]_d$ the set of polynomials of degree less than or equal to d, which has dimension $$k = \binom{m+d}{d}.$$

We enumerate all the points in $\mathbb{F}_q^m$:

$$\mathbb{F}_q^m = \{P_1, \ldots, P_n\} \quad (5)$$

Where $P_i=(P_{i,1}, \ldots, P_{i,m}) \in \mathbb{F}_q^m$, is a m-tuple of $\mathbb{F}_q$-symbols, and $n=q^m$. We encode a polynomial F of degree less than d into a codeword c of length n using the evaluation map $$ev: \mathbb{F}_q[x]_d \to \mathbb{F}_q^n$$
$$F \mapsto (F(P_1), \ldots, F(P_n))$$

and the d-th order Reed-Muller code is $$RM_d = \{ev(F) | F \in \mathbb{F}_q[X]_d\}.$$

The evaluation map ev encodes k symbols into n symbols, and the rate is $R=k/n \in [0,1]$. A codeword $c \in RM_d$ can be indexed by integers as $$c = (c_1, \ldots, c_n)$$

or by points as $$c = (c_{P_1}, \ldots, c_{P_n})$$

Where $c_i = c_{P_i} = f(P_i)$.

Assuming $d < q$, we now recall how $RM_d$ achieves a locality of $l=q-1$ as follows.

Suppose that $c=ev(F) \in RM_d$ is a codeword, and that $c_j=c_{P_j}$ is looked for. Then, the local decoding algorithm randomly picks a non-zero vector $v \in \mathbb{F}_q^m \setminus \{0\}$ and considers the line D of direction V passing through $P_j$:

$$D = \{P_j + t \cdot V \mid t \in \mathbb{F}_q\}$$
$$= \{P_j + 0 \cdot V, P_j + \alpha_1 \cdot V, \ldots, P_j + \alpha_{q-1} \cdot V\}$$
$$= \{R_0 = P_j, \ldots, R_{q-1}\} \subset \mathbb{F}_q^m.$$

Then, the points $R_1, \ldots, R_{q-1}$ are sent as queries, and the decoding algorithm receives the answer:

$$(y_{R_1}, \ldots, y_{R_{q-1}}) \in \mathbb{F}_q^{q-1}.$$

Figure 1:
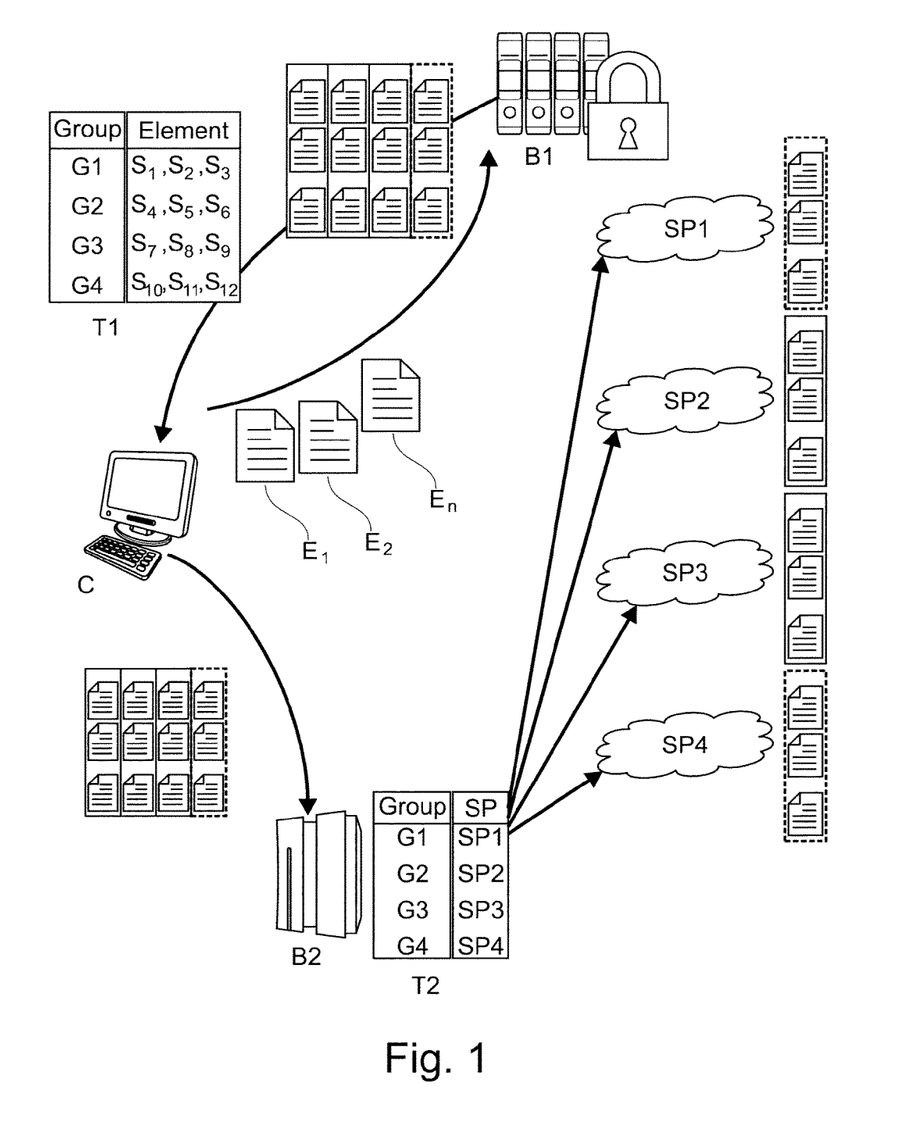
FIG. 1 depicts a storage and query organization according to an embodiment of the invention.

In the case of no errors, $(y_{R_1}, \ldots, y_{R_{q-1}}) = (c_{R_1}, \ldots, c_{R_{q-1}})$. Now $$c_{R_i} = F(P_j + a_u \cdot V) = F_{P,V}(a_u), u=1, \ldots, q-1$$

where $$F_{P,V} = F(P_j + T \cdot V) \in \mathbb{F}_q[T] \quad (6)$$

is the restriction of F to the line D, which is a univariate polynomial of degree less than or equal to d, i.e. $(c_{R_1}, \ldots, c_{R_{q-1}})$ belongs to a Reed-Solomon code $RS_d$ of length $q-1$ and dimension $d+1$, and $(y_{R_1}, \ldots, y_{R_{q-1}})$ is a noisy version of it. Using a decoding algorithm of $RS_d$, one can recover $F_{P,V}$, and then $c_{P_j}$ is found as $c_{P_j} = F_{P,V}(0)$. This local decoding algorithm is sketched in FIG. 1.

The main drawback of these codes is the condition $d<q$, which imposes a dimension $$k = \binom{d+m}{m} < \binom{q+m}{m} \sim q^m/m!.$$

For a fixed alphabet $\mathbb{F}$ and thus a small locality, the rate $R=k/q^m < 1/m!$ goes to zero very fast when the codes get longer.

To obtain codes with higher rates, we need a derivation order $s>0$ and an extended notion of evaluation. There are $$\sigma = \binom{m+s-1}{m}$$

Hasse derivatives H(F,i) of a polynomial F for multi-indices i such that $|i|<s$. Denoting $\Sigma = \mathbb{F}_Q^\sigma$, we generalize the evaluation map at a point P:

$$ev^s_P: \mathbb{F}_q[X] \to \mathbb{F}_q^\sigma$$
$$F \mapsto (H^{(F,i)(P)})_{|i|<s}$$

Algorithm 1 Local decoding algorithm for Reed-Muller codes

Require: Oracle Access to y = $(y_1, \ldots, y_n)$, a noisy version of
c = ev(F) $\in RM_d$.
Input: $j \in [n]$, the index of the symbol $c_j$ looked for in c
Output: $c_j = c_{P_j} = ev_{P_j}(F)$
 1: Randomly pick $U \in \mathbb{F}_q^m \setminus \{0\}$
 2: Consider the line
    $D = \{P_j + 0 \cdot U, P_j + \alpha_1 \cdot U, \ldots, P_j + \alpha_{q-1} \cdot U\}$
       $= \{R_0, \ldots, R_{q-1}\}$
 3: Send $R_1, \ldots, R_{q-1}$ as queries,
 4: Receive the answers: $y_{R_1}, \ldots, y_{R_{q-1}}$.
 5: Identify $(y_{R_1}, \ldots, y_{R_{q-1}})$ as a noisy version of a Reed-Solomon codeword
    c = $(F_{P,V}(\alpha_1), \ldots, F_{P,V}(\alpha_{q-1}))$
       ▷ where $F_{P,V}$ is defined in Eq. (6).
 6: Use a Reed-Solomon decoding algorithm to recover the polynomial $R_{P,V}$
 7: return $R_{P,V}(0)$.

and, given an enumeration of the points as in Eq. (5), the total evaluation rule is $$ev^3 : \mathbb{F}_q[X] \to \Theta^n$$
$$F \mapsto (ev_{P_1}^3(F), \ldots, ev_{P_u}^3(F))$$

As in the case of classical Reed-Muller codes, we denote by $(c_1, \ldots, c_n) = (c_{P_1}, \ldots, c_{P_n}) = ev^s(F)$, i.e. $c_i = c_{P_i} = ev_{P_i}^s(F)$. We can consider $\mathbb{F}_q[X]_d$, with $d < sq$, and the corresponding code is $$m\text{-}RN_d^3 \stackrel{\text{def}}{=} \{ev^3(F) | F \in \mathbb{F}_q[X]_d\}$$

Using the language of locally decodable codes, we have a code m-$RM_d^s: \Delta^k \to \Theta^n$ with $\Delta = \mathbb{F}_q$, and $\Sigma = \mathbb{F}_q^\sigma$. The code $RM_d^s$, is a $\mathbb{F}_q$-linear space, whose dimension over $\mathbb{F}_q$ is $$k = \binom{m+d}{m}.$$

Its rate is $$R = \frac{\log_q |\mathbb{F}_q[X]_d|}{\log_q |\Sigma|^n} = \frac{k}{\sigma n} = \frac{\binom{m+d}{m}}{\binom{m+s-1}{m} \cdot q^m}$$

with a locality of $$(q-1)\sigma = (q-1)\binom{m+s-1}{n}$$

queries, as follows. For simplicity, we only recall the decoding algorithm, in the error-free case. Suppose that $c_j = c_{P_j}$ is looked for, then the algorithm picks $\sigma$ vectors $V_i \in \mathbb{F}_q^m \setminus \{0\}$, $i=1, \ldots, \sigma$. For each $v_i$, $i=1, \ldots, \sigma$, consider the line of direction $V_i$ passing through $P_j$:

$$D_i = \{P_j + 0 \cdot V_i, P_j + \alpha_1 \cdot V_i, \ldots, P_j + \alpha_{q-1} \cdot V_i\}$$
$$= \{R_{D,j} = P_j, R_{i,1}, \ldots, R_{i,q-1}\} \subset \mathbb{F}_q^m$$

For each i, $1 \leq i \leq \sigma$, the algorithm output the queries corresponding to the points $R_{i,1}, \ldots, R_{i,q-1}$, and gets the answers $$(y_{P_j + \alpha_1 \cdot v_i}, \ldots, y_{P_j + \alpha_{q-1} \cdot v_i}) \in \Sigma^{q-1}$$

In the case of no errors, we have $$y_{P_j + \alpha_u \cdot v_i} = c_{P_j + \alpha_u \cdot v_i} u = 1, \ldots, q-1,$$

and, $c_{P_j + \alpha_u \cdot v_i} = F(P_j + \alpha_u V_i) = F_{P_j, v_i}(\alpha_u)$, where $$F_{P_j, v_i} = F_{P_j, v_i}(T) = F(P_j + T \cdot V_i). \quad (7)$$

Use a Reed-Solomon decoding algorithm adapted to the multiplicity case [3], that we recall in Appendix, one can recover:

$$F_{P_j, v_i}$$

as a univariate polynomial, even when a large number of errors occurs. Now, from Eq. (2), for $0 \leq t \leq s-1$, the t-th coefficient of $F_{P_j, v_i}$ gives a linear equation on the Hasse derivatives:

$$\text{coeff}(F_{P_j, V_i}, t) = \sum_{|v|=t} H(F, v)(P_j) V_i^v. \quad (8)$$

Figure 2A:
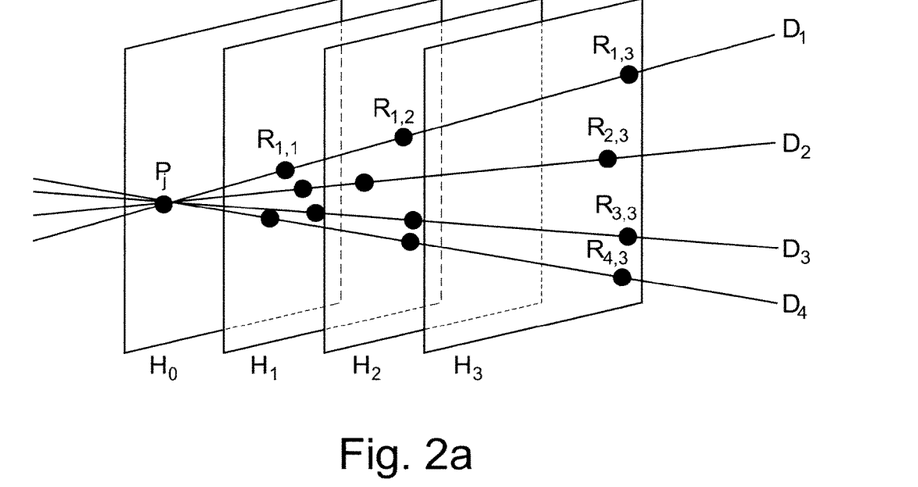
FIGS. 2a and 2b depict queries and hyperplanes according to an embodiment of the invention.

For a given t as above, for a given direction, we have one linear equation $v_i, 1 \leq i \leq \sigma$, in the indeterminates H (F, v)($P^j$), $|v|=t$. Considering all the $\sigma$ directions, we get a linear system of $\sigma$ equations. Solving it gives all the Hasse derivatives of order t, H(F,v)($P_j$),$|v|=t$. Doing that for each t=0, ..., s-1 permits to recover $ev^s(F, P_j) = c_{P_j} = c_j$. The local decoding algorithm is sketched in FIG. 2.

The decoding algorithm of [6] is actually much more elaborate, and deals with more erros. However, for our concerns, the simplified version is sufficient.

Considering m-$RM_d^s$, we show how to equally share a codeword $$c = ev^3(f) = (ev_{P_1}^3(f), \ldots, ev_{P_n}^3(f))$$

on l=q servers, using the geometry of $\mathbb{F}_z^m$. This is done as follows: consider H a $\mathbb{F}_q$-linear subspace of $\mathbb{F}_q^m$ of dimension m–1. It can be seen as the kernel of a linear map $$f_H : \mathbb{F}_q^m \to \mathbb{F}_q (x_1, \ldots, x_m) \mapsto h_1 x_1 + \ldots + h_m x_m$$

for some $(h_1, \ldots h_m) \in \mathbb{F}_q^m \setminus \{0\}$. We write $\mathbb{F}_q^m$ as disjoint union of affine hyperplanes $$\mathbb{F}_q^m = H_0 \cup H_1 \mathring{\cup} \ldots \cup H_{q-1}$$

where $$H_i = \{P \in \mathbb{F}_q^m | f_H(P) = \alpha_i\}, i=0, \ldots, q-1$$

Up to a permutation of the coordinates, we can write $$c = (c_{H_0} | \ldots | c_{H_{q-1}}),$$

where $$c_{H_i} = (ev_P^S(f) : P \in H_i), i = 0 \ldots, q-1$$

Now consider an affine line, which is transversal to all the hyperplanes. It is a line which can be given by any direction V passing and a point P, as long as $f_n(V) \neq 0$:

$$D = \{P + t \cdot v | t \in \mathbb{F}_q\}.$$

Then, since $V \notin H$ we have that $$D \cap H_i = \{Q_i\}, i=0, \ldots, q-1$$

for some points $Q_0, \ldots, Q_{q-1}$, i.e. the line D is transversal to all the hyperplanes. Now, it is easy to see that Algorithm 1 works as long as the vector V picked in Step 2 of 1 does not belong to h. Algorithm 2 also, although it needs more details to be explained.

As an example, consider the $\mathbb{F}_q$-linear hyperplane h of $\mathbb{F}_q^m$:

$$H=\{P=(x_1, \ldots, x_m)|x_m=0\},$$

then we have $$\mathbb{F}_q^n = H_0 \cup H_1 \cup \ldots \cup H_{q-1}$$

Where $$H_i=\{P=(x_1, \ldots, x_m) \in \mathbb{F}_q^n | x_m = \alpha_i\}, i=0, \ldots, q-1$$

Assuming that $\mathbb{F}_q^m$ is split as $\mathbb{F}_q^m = H_0 \cup H_1 \cup \ldots \cup H_{q-1}$, the PIR schemes can be built by requiring that clear, for i= 1, . . . , q, each server $S_i$ will be given $c_{H_i}$ to store, and local decoding must be done using transversal lines. The user will first select σ transversal lines $D_i$, i=1, . . . σ, which passes through the point $P_j$ which corresponds to the requested symbol, and query each server $S_i$ at the point $D \cap H_i$. In algorithm 2 2, the main and only change is to make sure that all σ lines are indeed transversal to the chosen hyperplanes.

Note that the locality of the locality code does not map to the number of servers: while the codes have a locality of qσ, the number of requested servers is still q. Yet the number of queries is still qσ, each server receiving σ queries.

A difficulty occurs in the sense the code requires (q−1) queries along each line. In our context, when $P_j$ is requested, all σ lines have to pass through $P_j$. The requests sent to the codeword corresponds to q−1 points different from $P_j$ on each line. Using our example, assume $P_j=(x_1, \ldots, x_m)$ with $x_m=\alpha_i$, for some i. Then, no queries has to be sent to the i-th server who stores the $c_{H_i}$ part of the encoded codeword: the i-th servers will know that it has the index of the request among its indices. This is clearly a drop in privacy, from $q^m$ to $q^{m-1}$.

Figure 2B:
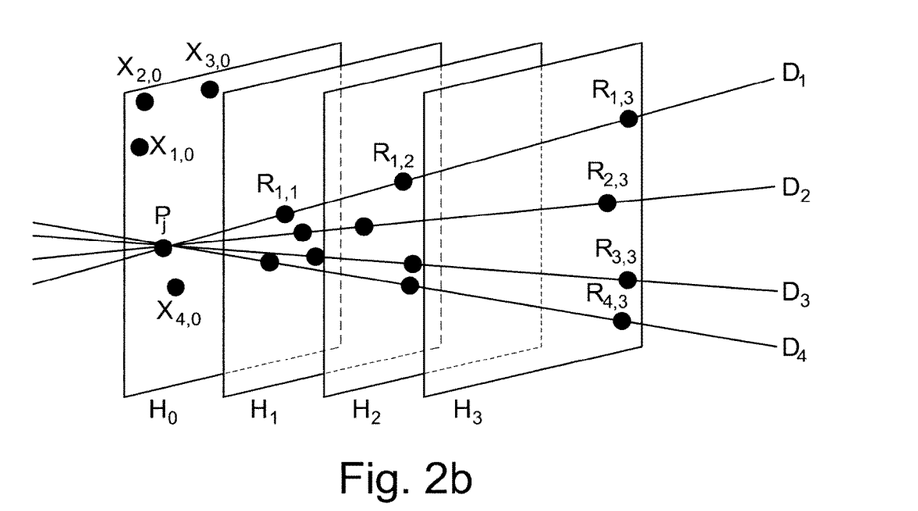

Using the notation of Algorithm 2, a solution to this problem is to send σ random query $x_{u,i}$, u=1, . . . , σ, to server $S_i$. This is enough to obfuscate server $S_i$ (FIG. 2).

The protocol described above can be summed up as follows:
Preprocessing Phase.
The user, or any trusted party 1. chooses q, m, d, s so that the original data x of bitlength k can be encoded using the multiplicity code of order s evaluations of polynomials of degree≤d in m variables over $\mathbb{F}_q^m$; namely choose the parameters so that;

$$\binom{m+d}{d} \log_2 q \geq k$$

2. splits $\mathbb{F}_q^m$ as q hyperplanes. $\mathbb{F}_q^m = H_0 \cup H_1 \cup \ldots H_{q-1}$. On FIGS. 2a and 2b, parameters are q=4, m=3, s=2, σ=4. Queries for a Multiplicity code used as an LDC codes (a), used in PIR scheme (b), assuming that the point $P_j$ corresponding to query j lies on the $H_o$ hyperplane. In the PIR scheme, random points $X_{1,0}, \ldots, X_{4,0}$ are sent to the server $S_o$ for hiding to him the fact that he hosts the index of the request. Not all point names are displayed for readability.

3. encodes the data x using the multiplicity code, resulting in the codeword $c=ev^s(F)$, where the coefficients of F represent the original data x;

4. gives each server $S_l$ the $C_{Hl}$ part of the codeword, i.e. the restriction of c on coordinate points of $H_l$.

Protocol.

The user wants to retrieve $ev_{P_j}^s(F)$ for an index $j \in [n]$ User selects σ lines $D_i$, $1 \leq i \leq \sigma$ which are transversal to the hyperplanes and which pass through $P_j$;

1. For $1 \leq l \leq q$, $l \neq u$ user sends the queries $$\{y_{R_{i,\ell}}\}_{1 \leq i \leq \sigma}.$$

to serve l. User sends σ random queries $X_{i,u}$, i=1, . . . σ, to server $S_u$, u is being such that $D_i \cap H_u = P_j$, i=1, . . . , σ

3. For $1 \leq l \leq q$ server sends the answer $$\{D_i \cap H_\ell = R_{i,\ell}\}_{1 \leq i \leq \sigma}$$

4. User then proceeds as in steps 6 to 9 of algo 2 to retrieve $ev_{P_j}^S(F)$.

---

Algorithm 2 Local decoding algorithm for Multiplicity Reed-Muller codes

Require: Oracle Access to $y = (y_1, \ldots, y_n)$, a noisy version of
$c = ev^s(F) \in m - RM_d$.
Input: $j \in [n]$, the index of the symbol $c_j$ looked for in c
Output: $c_j = c_{P_j} = ev_{P_j}^s(F)$
  1: Pick σ non zero random vectors $U_1, \ldots, U_\sigma$:
  2: for i = 1 to σ do
  3:   Consider the line
       $D_i = \{P_j + 0 \cdot U_i, P_j + \alpha_1 \cdot U_i, \ldots, P_j + \alpha_{q-1} \cdot U_i\} = \{R_{i,0}, \ldots, R_{i,q-1}\}$
  4:   Send $R_{i,1}, \ldots, R_{i,q-1}$, as queries,
  5:   Receive the answers: $y_{i,R_1}, \ldots, Y_{R_{i,q-1}}$, $i = 1, \ldots, \sigma$.
  6:   Identify $(y_{R_{i,1}}, \ldots, Y_{R_{i,q-1}})$ as a noisy version of a "Reed-Solomon" codeword
       $c = (F_{P_j, V_i}(\alpha_1), \ldots, F_{P_j, V_i}(\alpha_{q-1}))$
       ▷ where $F_{P_j, V_i}$ is defined in Eq. (7).
  7:   Use a "Reed-Solomon" decoding algorithm to recover the polynomial $F_{P, U_i}$.
  8: end for
  9: Solve in the indeterminates $H(F, v)(P_j)$, $|v| < s$, the linear system from Eq. (8):

$$\text{coeff}(F_{P_j, V_i}, t) = \sum_{|v|=t} H(F, v)(P_j) V_i^v \cdot \begin{cases} t = 0, \ldots, s-1, \\ i = 1, \ldots, \sigma \end{cases}$$

return $\{H(F, v)(P_j), |v| < s\} = ev_{P_j}^s(F)$.

REFERENCES

[1] A. Beimel, Y. Ishai, E. Kushilevitz, and J.-F. Raymond. Breaking the $n^{1/(2k-1)}$ barrier for information-theoretic private information retrieval. In B. Chazelle, editor, *Foundations of Computer Science, 2002. Proceedings. The 43rd Annual IEEE Symposium on*, volume 59, pages 261-270, 2002.

[2] B. Chor, O. Goldreich, E. Kushilevitz, and M. Sudan. Private information retrieval. *Journal of the A CM*, 45(6):965-981, November 1998. Earlier version in FOCS'95.

[3] Peter Gemmell and Madhu Sudan. Highly resilient correctors for polynomials. *Information Processing Letters*, 43(4):169-174, September 1992.

[4] V. Guruswami and C. Wang. Linear-algebraic list decoding for variants of reedsolomon codes. *Information Theory, IEEE Transactions on*, 59(6):3257-3268, June 2013.

[5] Jonathan Katz and Luca Trevisan. On the efficiency of local decoding procedures for error-correcting codes. In F. Yao and E. Luks, editors, *Proceedings of the Thirtysecond Annual ACM Symposium on Theory of Computing, STOC '00*, pages 80-86. ACM, 2000.

[6] S. Kopparty, S. Saraf, and S. Yekhanin. High-rate codes with sublinear-time decoding. In Salil Vadhan, editor, *Proceedings of the Forty-third Annual ACM Symposium on Theory of Computing, STOC'11*, pages 167-176, New York, N.Y., USA, 2011. ACM.

[7] E. Kushilevitz and R. Ostrovsky. Replication is not needed: single database, computationally-private information retrieval. In *Foundations of Computer Science, 1997. Proceedings. 38th Annual Symposium on*, pages 364-373, October 1997.

[8] Sergey Yekhanin. *Locally Decodable Codes and Private Information Retrieval Schemes*. Information security and cryptography. Springer, 2010.

[9] Sergey Yekhanin. *Locally Decodable Codes*, volume 6 of *Foundations and Trends in Theoretical Computer Science*. NOW publisher, 2012.

The invention claimed is:

1. A method of storing a set of original data elements in a plurality of remote servers such that any data element of the set of original data can be retrieved without communicating the identity of the retrieved data element to the plurality of remote servers, the method comprising:
storing a set of original data elements by:
using a locally decodable code with a locality value that is one fewer than the number of remote servers, creating a set of coded data symbols from the set of original data,
dividing the set of coded data symbols into distinct groups of coded data symbols, each group defining a hyperplane in an ambient space, such that no one group of coded data symbols contains a coded data symbol that is contained by any other group of coded data symbols,
generating a first table associating each symbol of the set of coded data symbols with a respective group of coded data symbols,
storing each group of coded data symbols in to a respective server of the plurality of remote servers, such that each coded data symbol is stored on only one of the plurality of remote servers, and
generating a second table associating each group of coded data symbols with the respective server,
such that a selected original data element of the set of original data elements can be retrieved by:
generating, using the locally decodable code, a query for each respective one of the plurality of remote servers based on the first table, the second table, and a string,
each query including a request for at least one coded data symbol, the included coded data symbols constituting a direction which is transverse to each hyperplane defined by each group of coded data symbols such that the selected original data element can be computed based on the plurality of results returned from each respective one of the plurality of remote servers.

2. The method according to claim 1, further comprising generating the query for each respective one of the plurality of remote servers based on the first table, the second table, and a string and receiving the at least one coded data symbol from each respective one of the plurality of remote servers.

3. The method according to claim 2, further comprising decoding the selected original data element from the one coded data symbol from each respective one of the plurality of remote servers.

4. The method according to claim 3, wherein the decoding is carried out using the locally decodable code.

* * * * *